Oct. 25, 1955   H. G. KLEMM ET AL   2,721,509
POWER-OPERATED HITCH SYSTEM FOR TRACTORS
Filed Feb. 17, 1950   2 Sheets-Sheet 2

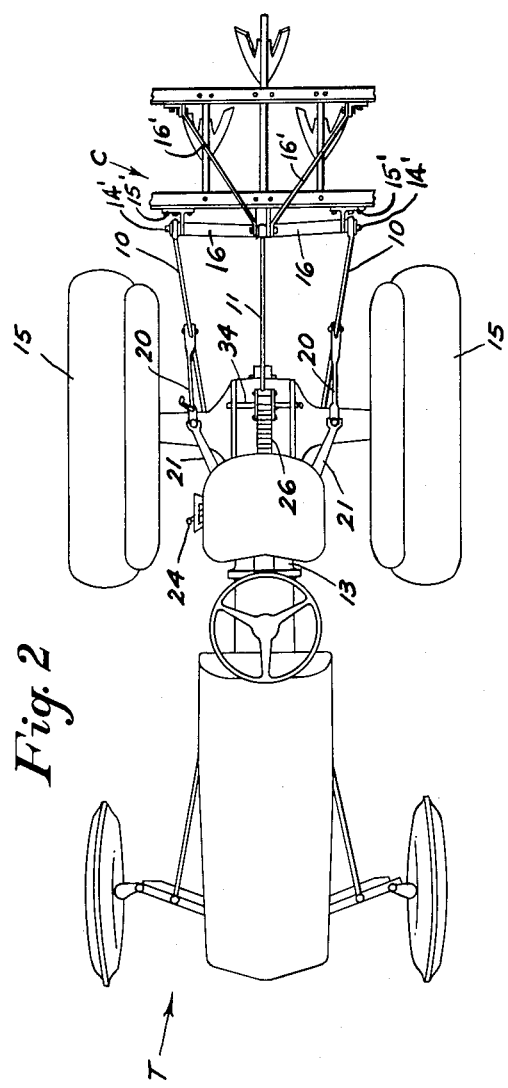
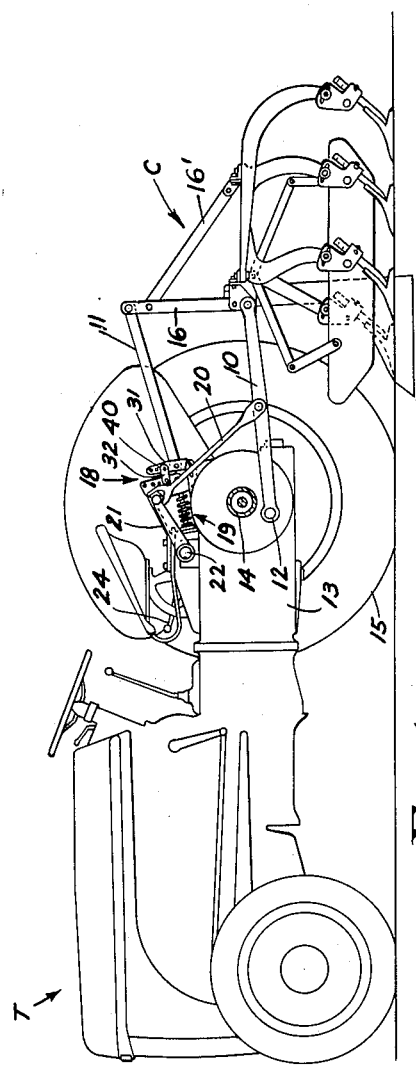

INVENTORS
HERMAN G. KLEMM
ERNEST V. BUNTING
BY
Carlson, Pitzner, Hubbard & Wolfe
ATTORNEYS

United States Patent Office 2,721,509
Patented Oct. 25, 1955

2,721,509

POWER-OPERATED HITCH SYSTEM FOR TRACTORS

Herman G. Klemm, Birmingham, and Ernest V. Bunting, Detroit, Mich., assignors to Harry Ferguson, Inc., Detroit, Mich., a corporation of Delaware Application February 17, 1950, Serial No. 144,618

10 Claims. (Cl. 97—46.07)

The invention relates to power-operated hitch systems for tractors and more particularly to hitch systems which automatically act to raise and lower the attached implement so as to maintain a substantially uniform working depth.

The basic system embodying the foregoing mode of operation, which is commonly known as automatic draft control, is disclosed in the Ferguson United States Patent No. 2,118,180, issued May 24, 1938. As shown in that patent a hitch linkage trailingly mounted at the rear end of a tractor is swung vertically by a hydraulic power unit driven from the tractor engine. Ground reaction or draft load on the implement attached to the hitch tends to rock the implement forwardly and such tendency is transmitted mechanically to a spring-loaded control element for the power unit. The resulting movements of the control element cause the power unit to raise or lower the hitch and the attached implement as may be required to maintain the draft load substantially uniform.

As is well known, there are wide variations in the ground reactions of different implements and even in the reactions of similar implements when used in different types of soils. Under such different operating conditions of course the variations available for control purposes and the adjustments required to correct deviation from a predetermined draft load vary correspondingly.

Power-operated systems of the above general character may be adapted for most efficient operation with different implements and under diverse operating conditions such as those above discussed by varying the sensitivity of the controls. A system embodying sensitivity regulating means as a built-in part of the system is disclosed and claimed in the copending Bunting United States application Serial No. 97,640, filed June 7, 1949. As explained in that application, the term "sensitivity" is used with reference to the speed or rapidity with which the system responds to a given change in a controlling force to restore such controlling force to a preselected value. More particularly, for a given change in the controlling force a highly sensitive system will respond with relatively great rapidity to restore the preselected value of the controlling force, while a system having a low sensitivity will respond to the given change much more slowly. Stated in another way, to produce a given rate of corrective response in a highly sensitive system only a relatively small change in the magnitude of the preselected controlling force is required, while for a like rate of response a system having low sensitivity will require a substantially greater change in the controlling force.

The general aim of the present invention is to provide for varying the sensitivity of the controls of a power-operated tractor hitch system of the general type shown in the aforementioned Ferguson patent without requiring any modification of the power unit or the controls ordinarily provided in the system.

Another object is to provide a simple and inexpensive mechanism which can be quickly and easily interposed in the hitch linkage to provide for varying the sensitivity of the control to the controlling forces generated by an implement attached to the linkage.

A more specific object is to provide for use in tractors having power-operated hitch linkages equipped for automatic draft control auxiliary mechanism for adjusting the sensitivity of the control which mechanism is in the form of a simple, compact unit adapted to be interposed in that portion of the controls located externally of the tractor housing and which requires only the simplest type of tool, such as a wrench, for its installation.

Still another object is to provide a simple, practical arrangement for varying the effectiveness of the portion of the linkage concerned with the transmission of the controlling forces so that the sensitivity of the controls to such forces may be adjusted without changing the geometrical relation of the linkage with respect to the tractor and associated operating and control elements.

Other objects and advantages of the invention will become apparent from the following detailed description of the preferred embodiment illustrated in the accompanying drawings, in which:

Figure 1 is a side elevational view of a tractor equipped with a power-operated hitch linkage and sensitivity adjusting mechanism embodying the features of the invention, a typical implement being shown as attached to the hitch linkage.

Fig. 2 is a plan view of the tractor and implement shown in Fig. 1.

Figure 3:
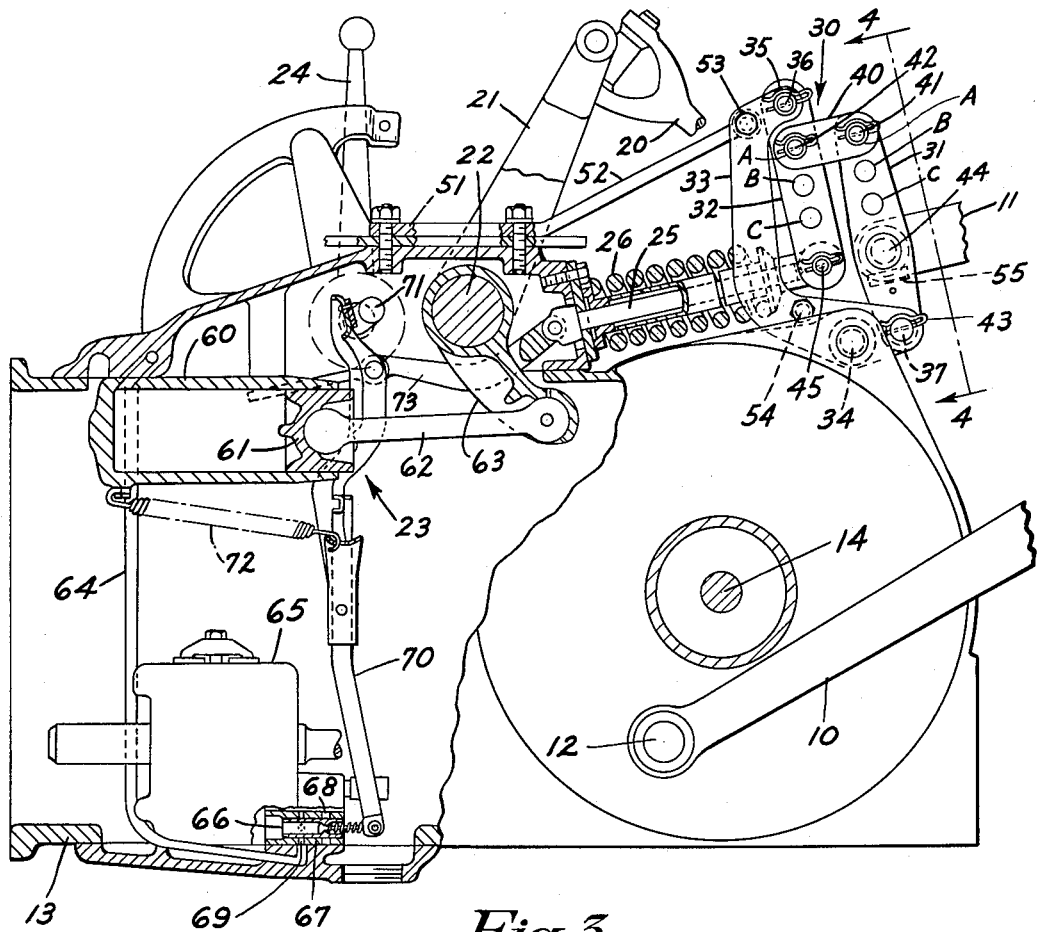
Fig. 3 is a fragmentary sectional view taken in a vertical plane through the rear end portion of the tractor.
Figure 4:
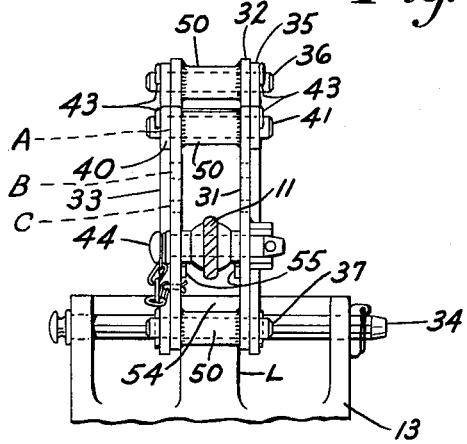
Fig. 4 is a view taken in section through the top link of the hitch substantially on the line 4—4 of Fig. 3, showing the sensitivity adjusting mechanism in rear elevation.

For purposes of illustration, a preferred embodiment of the invention has been shown and will be described in detail herein. It is not intended, however, that the detailed character of the disclosure should limit the invention to the specific form illustrated. On the contrary, the intention is to cover all modifications and alternative constructions falling within the spirit and scope of the invention as expressed in the appended claims.

Referring to the drawings, the invention has been shown as incorporated in a lightweight four-wheeled tractor T generally similar to that disclosed in the above-mentioned Ferguson patent. At the rear end of the tractor is mounted a hitch linkage comprising a pair of lower hitch links 10, commonly called draft links, and a top or compression link 11. The lower hitch links 10 are arranged side by side and converge forwardly. Their front ends are pivotally secured at 12 for universal swinging movement on the center housing 13 of the tractor below and slightly forward of the rear axle 14 upon which the tractor's pneumatically-tired rear traction wheels 15 are mounted. At their rear ends the links 10 are attached by suitable swivel connections with laterally spaced connecting elements on an implement C, the elements in this instance being pins 14' carried by brackets 15' extending forwardly from the implement frame. This permits the implement to tilt fore and aft about the axis of the pins within limits imposed by the top link 11, as will appear presently. Brackets 15' also support the lower ends of an upright V-shaped strut 16 which is held rigid with the implement frame by rearwardly diverging braces 16'.

The lower hitch links 10 are sustained by drop links 20 depending from crank arms 21 rigid with and projecting radially from a transverse rockshaft 22 journaled on the tractor housing. A power unit 23 located within the housing is arranged to rock the shaft 22 to raise or lower the hitch links 10 and the implement attached thereto. In systems equipped with automatic draft control, operation of the power unit is controlled jointly by a hand lever 24, commonly called the quadrant lever, and by a control element 25 yieldably retained in a free or balanced position by a main control spring 26. The control element is adapted to be shifted from its free position in accordance with the force tending to rock the element about its pivotal connection with the hitch links. Adjustment of the quadrant levers determines the value of the force it is desired to maintain on the control element, and upon any variation therefrom, the power unit is caused to raise or lower the hitch linkage to reestablish the value preselected by the hand lever.

Transmission of the control force from the implement to the control element is effected by the top link 11. For this purpose the top link is operatively coupled at its forward end with the control element 25 and connected at its other end with the implement at a point spaced above and substantially centrally of the brackets 15', in this instance to the strut 16. Thus when the implement is drawn forwardly in operating or ground-engaging position, the ground resistance opposed to such forward movement tends to rock the implement counterclockwise as viewed in Fig. 1 and a forward thrust is exerted through the top link corresponding in magnitude to the sum of the moments acting on the implement and tending to produce the rocking action.

In accordance with the invention, novel means indicated generally at 30 is provided for coupling the top link 11 with the control element 25 so that the displacement of the element against the force exerted by the control spring 26 by application of a given force through the link may be varied whereby to adjust the sensitivity of the controls to best meet the conditions imposed by the type of implement attached to the hitch and the character of the soil in which the implement is to be operated. More particularly, the coupling means 30 is constructed and arranged so that it may be adjusted to cause the power unit to respond to changes in the control force at the rate best suited for prevailing conditions. Of particular importance in this connection is the fact that such adjustments may be made without changing the geometrical relation of the hitch links and the power operating and control elements of the tractor.

Preferably, the coupling means 30 is constructed as a simple, compact unit capable of being mounted on the tractor and connected for operation with very little labor. As herein shown the coupling means comprises a mechanical linkage or system of levers including a pair of levers 31 and 32 arranged in generally parallel spaced relation and fulcrumed at their oppositely disposed ends on a bracket 33. This bracket may be mounted on the tractor housing 13 in any suitable manner, but for convenience of installation it is preferred to mount it on the bushing 34 carried between the upstanding ear or control lug L on the tractor housing for attachment of the rocker member to which the top link of the hitch is conventionally connected.

The bracket 33 as herein shown is generally L-shaped and has a relatively short rearward projection 35 at its upper end to which the upper end of the lever 32 is fulcrumed as by a pin 36. The lever 31 is fulcrumed at its lower end on a pin 37 carried by the bracket 13 at a point spaced substantially below and rearwardly of the fulcrum for the lever 32, in this instance at the end of the toe portion of the bracket.

When mounted on the bracket 33 in the above manner, the levers 31 and 32 extend in opposite directions from their respective pivots in side-by-side relation. A rigid shackle 40 extending between the levers connects them to swing in unison, the levers and shackle being constructed for attachment of the latter at any one of a plurality of points spaced apart longitudinally of the levers so as to vary the leverage ratio of the system. Preferably, attachment of the shackle 40 to the respective levers is effected by pins 41 and 42 inserted through alined apertures in the levers and at opposite ends of the shackle. Cotter pins 43 hold the pins in place and permit quick and easy shifting of the shackle.

The levers 31 and 32 are also arranged for convenient connection respectively with the top link 11 and with the control element 25 as by pins 44 and 45. Preferably, the apertures for the pins of both levers are arranged substantially on a line with the central axis of the control element as shown in Fig. 3. With the parts so connected, thrust forces exerted on the top link 11 are transmitted through the lever 31, shackle 40 and lever 32 to the control element 25. The ratio of the force actually applied to the control member 25 as compared to the force exerted on the top link is determined of course by the leverage ratio of the lever system.

As indicated above, provision is made for attaching the shackle at any one of a plurality of points along the levers. For this purpose, each lever is provided with a series of apertures for receiving the shackle-connecting pins, there being three such apertures in the exemplary coupling means designated respectively a, b, and c. The apertures are spaced apart longitudinally of the lever at progressively varying distances from the pivots thereof. In the case of the lever 31 which is a lever of the third order, the aperture a is farthest from and the aperture c nearest the pivot. Lever 32 is also a lever of the third order and the spacing of the apertures from the pivot point is the reverse of that for the companion lever.

It will be apparent that with the above described arrangement, shifting of the connecting shackle from one set of apertures to the other will vary the ratio of both levers simultaneously and in the same direction. By way of example, the parts of the lever system may be proportioned so that attachment of the shackle 40 at the apertures a as shown in Fig. 3 provides an over-all leverage ratio on the order of 9:1. Accordingly, the force actually applied to the control element is approximately one-ninth of the force exerted on the top link.

In the exemplary lever system, the second set of apertures b is located so that with the shackle connected thereto the leverage ratio is reduced to a predetermined fraction of the initial leverage ratio, as for example, one-half of such ratio, or on the order of 4.5:1. Similarly, the third set of apertures c may be spaced from the preceding set so as to reduce the leverage ratio a further predetermined amount, as for example to 2.25:1. It will be understood, of course, that the above figures are merely exemplary and that any preferred leverage ratio may be employed. It will also be understood that the number of shackle-connecting positions or sets of apertures provided is a matter of choice and that the three positions shown are merely illustrative.

The changes in the leverage ratio of the coupling means changes the sensitivity of the controls in a corresponding manner. Thus the force required to shift the control element 25 a given distance against the force exerted by the control spring 26 is at a maximum when the shackle 40 is connected at the apertures a. When the shackle is shifted to the intermediate position represented by the apertures b, the force required to produce the same displacement of the control element is substantially reduced, in this instance, approximately one-half. The force required to produce the desired displacement of the control element is again halved by connecting the shackle at the apertures c. The connections of the top link 11 and control element 25 to their respective coupling levers are not altered or disturbed in any way and consequently these elements are maintained in the same geometric relation for the different operating conditions.

It will be apparent that the control system may be readily adapted for proper response to the control forces available with any implement by simply changing the connection between the levers 31 and 32. For cultivating and similar work where the ground reaction forces are relatively low and the controlling forces correspondingly small, the coupling means will be connected as shown in Fig. 1 to provide the greatest sensitivity. For plowing or other heavy work, on the other hand, ground reaction forces are high and the controlling forces are relatively large. Less sensitivity is desirable under such conditions and the connecting shackle 40 will be shifted toward the high ratio position as shown in Fig. 3. Such changes may be effected quickly and easily by reason of the pin connection provided and without changing the normal relation of the top link 11 with respect to the control element 25.

For convenience of manufacture and to eliminate unnecessary weight, the levers 31 and 32 are preferably constructed from a pair of elongated flat bars arranged in spaced parallel relation and rigidly connected together at opposite ends by means of tubular spacers or bushings 50. These bushings are positioned to receive the pivot pins 35 and 37 and the pins 41 and 42 for attaching the shackle 40. The link may also comprise a pair of flat bars.

The bracket 33 may also be constructed in the form of a pair of side members spaced apart so as to straddle the lug L on the tractor frame. These bracket members when disconnected from the tractor are held in assembled relation with the levers by means of the connecting pins so that the bracket and levers constitute a unitary structure.

In practice it is desirable to provide a suitable brace for the upper end of the bracket. This brace as shown in Fig. 3 may comprise a plate 51 adapted to be attached to the tractor housing cover by means of bolts now provided thereon for other purposes. An arm 52 integral with the plate extends rearwardly to project between the side members of the bracket. The arm may be rigidly secured to the bracket as by a bolt 53. A bolt 54 provided in the toe portion of the bracket and extending through a suitable spacer assists the brace arm and pin 34 in holding the bracket rigidly in place.

To facilitate connection of the top link 11 to the lever 31, the side plates of the lever are desirably provided on their inner sides with guide elements 55. These guide elements may consist of short metal bars welded or otherwise permanently secured to the lever members and positioned so as to facilitate the alinement of the holes in the link and lever for insertion of the pin 44.

In the exemplary tractor the power unit 23 is of the hydraulic type and includes an actuator in the form of a one-way ram comprising a rearwardly opening cylinder 60 having a piston 61 working therein. The piston is operatively connected with the rockshaft 22 by a thrust rod 62 having ball-shaped ends received respectively in sockets formed in the piston and in the lower end of a crank arm 63 rigid with the rockshaft. With this arrangement the admission of fluid under pressure to the forward end of the cylinder 60 forces the piston 61 rearwardly to rock the shaft 22 counterclockwise and swing the links 10 upwardly about their pivots 12. Conversely, exhaust of fluid from the cylinder permits the piston to retreat and the hitch links 10 to swing downwardly under the force of the load imposed thereon.

Pressure fluid is supplied to the cylinder 60 by way of a conduit 64 from a pump 65 driven in well-known manner from the tractor engine. Preferably the pump 65 is mounted within the housing 13 which serves as a sump or reservoir for the fluid, such as oil, used in the hydraulic system. Control of the power unit by the control element 25 and quadrant lever 24 is effected through the medium of valve mechanism comprising in this instance a valve plunger 66 slidable in a sleeve or bushing 67 mounted in the body of the pump 65. This sleeve is formed with two sets of ports including intake or supply ports 68 and exhaust or drain ports 69 spaced apart axially of the sleeve so that both sets of ports may be closed simultaneously by the plunger 66 or either set may be open while the other is closed. Thus when the valve plunger 66 is shifted to the left from a central or neutral position to the "raising" position in which it is shown in Fig. 3, the supply ports 68 are uncovered and the pump 65 draws fluid from the sump and discharges it under pressure through the conduit 64 into the cylinder 60. When the valve plunger is shifted in the opposite direction to uncover the exhaust ports 69, the intake ports 68 remain closed thus preventing pumping action and permitting fluid to drain from the cylinder 60. When the valve plunger is in its central or neutral position, both sets of ports are blocked so that no fluid is pumped to the actuator cylinder and none is permitted to escape therefrom. Consequently, the hitch linkage is held in fixed position.

Shifting of the valve plunger 66 to control the operation of the hydraulic actuator is effected jointly by the hand lever 24 and the control member 25 through a floating lever 70. The hand lever 24, as shown, is mounted on a shaft 71 journaled in the tractor housing and having an eccentric portion providing a fulcrum for the upper end of the floating lever which may be adjusted fore and aft by rocking the hand lever. At its lower end the floating lever is suitably connected with the valve plunger 66 and a spring 72 acting on the intermediate portion of the lever urges the valve plunger inwardly or toward a position to open the intake ports.

The control element 25, which is herein shown in the form of a plunger extending axially through the spring 26, has its forward end projecting into the housing 13 and operatively connected with the floating lever 70 by means of a forked link 73 so that the lever follows the movements of the control element. In operation, the control element 25 is displaced inwardly from its idle position shown in Fig. 3 and the control spring 26 is compressed by the thrust force applied through the top link 11. The setting of the quadrant lever 24, of course, determines the extent of such displacement required to locate the valve plunger 66 in its central or neutral position. Thus, the control element itself may be said to have a neutral position determined by the quadrant lever.

Displacement of the element from neutral position in either direction as a result of a change in the controlling force such as occurs when the implement varies from its predetermined working depth is reflected by a corresponding shifting of the valve plunger and the consequent operation of the power unit to raise or lower the implement as required to reestablish the balance of the control system. The coupling means of the present invention permits quick and easy adjustment of the rate of response or sensitivity of the controls and power unit to any given change in the control force applied through the top link of the hitch. The system may thus be adapted to operate in the most efficient and reliable manner with any implement associated with the tractor and in accordance with the particular soil conditions prevailing.

The improved coupling means is simple and inexpensive in construction. Due to its unitary character and novel mode of attachment to the tractor, no special skill is required for its installation and only simple tools are required for that purpose. It is particularly to be noted that no modification of the tractor or the controls with which it is ordinarily equipped is required. When installed, adjustments for sensitivity are quickly and easily made without disturbing the normal geometrical relation of the hitch links and control elements.

We claim as our invention:

1. In a tractor having an implement hitch including a link actuated by a force corresponding in magnitude to the sum of the moments acting on an implement trailed from the hitch and tending to rock the implement fore and aft about the linkage, a power unit driven from the tractor engine and connected to the hitch for raising and lowering the same, a movable element for controlling the operation of said power unit, the improvement comprising a lever system including a first lever pivoted on the tractor and connected with the control element so as to move the latter when rocked about its pivot, a second lever pivoted on the tractor and operatively connected with the hitch link to be rocked about its pivot by a force applied through the hitch link, the connection between said first lever and the control element and the connection between the second lever and the hitch link being alined substantially with the longitudinal axis of the control element, and a rigid shackle operatively connecting said two levers for transmission therebetween of forces in either tension or compression, said shackle being shiftable relative to the pivots of said levers, and said pivots being related to each other so that the motion transmitting effectiveness of the lever system may be varied without changing the alinement of the control element and the hitch link.

2. For use with a tractor having a spring loaded control element and a hitch including a top link, a coupling unit for operatively connecting the top link of a tractor hitch with the spring-loaded control element of the tractor, said unit comprising a bracket adapted to be mounted on the tractor, a pair of generally parallel levers pivoted at respectively opposite ends on said bracket and having a connection such that they swing in unison, one of said levers having means for connecting it with the top link and the other lever having means for connecting it with the control element, the connection between said levers being adjustable so as to change the lever ratio afforded by the coupling.

3. For use with a tractor having a spring loaded control element and a hitch including a top link, a coupling unit for operatively connecting the top link of the tractor hitch with the spring-loaded control element of the tractor, said unit comprising a bracket adapted to be mounted on the tractor, a pair of levers pivotally mounted on said bracket and connectible respectively with the top link and the control element, and a rigid shackle connecting said levers for swinging in unison under forces applied either in tension or compression through the top link, said shackle being attachable to each of said levers at any one of a plurality of points spaced apart longitudinally of the levers to determine the leverage ratio of the connection, the pivots of said levers being related to each other so that the effective lengths of the levers are varied inversely at the different points of connection of said shackle.

4. For use with a tractor having a spring loaded control element and a hitch including a top link, a coupling unit for operatively connecting the top link of the tractor hitch with the spring-loaded control element of the tractor, said unit comprising a bracket removably mountable on the tractor, a variable ratio lever system including a pair of levers respectively pivoted at their upper and lower ends on said bracket, removable connecting elements for operatively connecting one of said levers with the top link and the other of said levers with the control element, the points at which the levers are connected with the top link and the control element being substantially alined with the longitudinal axis of the control element, and a rigid shackle operative to connect said levers together at any of a plurality of points spaced apart longitudinally of the levers.

5. For use with a tractor having a spring loaded control element and a hitch including a top link, a coupling unit for operatively connecting the top link of the tractor hitch with the spring-loaded control element of the tractor, said unit comprising a bracket removably mountable on the tractor, a variable ratio lever system including a pair of levers respectively pivoted at their upper and lower ends on said bracket, a rigid shackle operative to connect said levers together at any of a plurality of points spaced apart longitudinally of the levers, said levers being connectible respectively with the top link and with the control element so as to maintain the same geometrical relation between them for any leverage ratio within the range of the system.

6. For use with a tractor having a spring loaded control element and a hitch including a top link, a coupling unit for operatively connecting the top link of the tractor hitch with the spring-loaded control element of the tractor, said unit comprising a bracket removably mountable on the tractor, a lever system carried by said bracket including a first lever pivoted on the bracket and disengageably connectible with said top link and a second lever pivoted on the bracket and disengageably connectible with the control element, each of said levers having its pivot located adjacent the free end of the other lever and a rigid shackle connected to each of said levers intermediate their pivots and their free ends, the connections between said shackle and said levers being adjustable to change the leverage ratio of the lever system.

7. For use with a tractor having a spring loaded control element and a hitch including a top link, a coupling unit for operatively connecting the top link of the tractor hitch with the spring-loaded control element of the tractor, said unit comprising a generally L-shaped bracket having means adjacent its lower end for attachment to the tractor, a lever pivoted at one end on the upper end of said bracket and having its other end apertured to receive a pin for connecting the lever with the control element, a second lever pivoted at one end on the lower end of said bracket and having its intermediate portion apertured to receive a pin for connecting that lever to the hitch link, and a rigid shackle for connecting said levers together at any of a plurality of selected points spaced apart longitudinally of the levers, said apertures in the levers being substantially alined with the central axis of the control element in all positions of said shackle.

8. For use with a tractor having a spring loaded control element and a hitch including a top link, a coupling unit for operatively connecting the top link of the tractor hitch with the spring-loaded control element of the tractor, said unit comprising a generally L-shaped bracket having means adjacent its lower end for attachment to the tractor, a lever pivoted at one end on the upper end of said bracket and having its other end apertured to receive a pin for connecting the lever with the control element, a second lever pivoted at one end on the lower end of said bracket and having its intermediate portion apertured to receive a pin for connecting that lever to the hitch link, and a rigid shackle for connecting said levers together, said first-mentioned lever having means for connecting the shackle at any one of a plurality of points located between its pivot and the pin receiving aperture, and said second lever having means for connecting the shackle at any one of a plurality of points located between the pin receiving aperture in that lever and the free end of the lever.

9. For use with a tractor having a spring loaded control element and a hitch including a top link, a coupling unit for operatively connecting the top link of the tractor hitch with the spring-loaded control element of the tractor, said unit comprising a generally L-shaped bracket having means adjacent its lower end for attachment to the tractor, a lever pivoted at one end on the upper end of said bracket and having its other end apertured to receive a pin for connecting the lever with the control element, a second lever pivoted at one end on the lower end of said bracket and having its intermediate portion apertured to receive a pin for connecting that lever to the hitch link, the apertures in said levers being disposed so as to locate them substantially in line with the central axis of the control element when the levers are in parallel relation, and a rigid shackle connected at opposite ends to the respective levers by disengageable cross pins, each of said levers having a plurality of apertures for receiving said cross pins and said apertures being spaced apart longitudinally of the levers so as to provide different leverage ratios in the connection between the top link and the control element.

10. In a tractor having an implement hitch including a pair of draft links and a compression link, a power unit operable to raise or lower the draft links, a main control spring, a control element arranged to be urged in one direction by a force applied by said spring and in the opposite direction by a force applied through said compression link, said control element acting when said forces are in balance to render said power unit inactive and acting when said forces are unbalanced to initiate the operation of said power unit to raise or lower the hitch links until the balance is reestablished, the improvement comprising, in combination, means operatively coupling the compression link and the control element including a pair of levers each pivoted adjacent one end on the tractor, means pivotally connecting one of said levers to the compression link at a point intermediate the ends of that lever, means pivotally connecting the other of said levers to the control element adjacent the end of that lever remote from its pivot on the tractor, and a connecting element for coupling said levers together to swing in unison, each of said levers having a series of apertures for connection with said element, the apertures in said one lever being spaced apart longitudinally thereof and located between the pivotal connection of that lever with the compression link and the end of the lever remote from its pivotal connection with the tractor, the apertures in said other lever being similarly spaced apart and located between the pivotal connections of that lever with the tractor and the control element, said connecting element being shiftable between corresponding pairs of said apertures so as to change the lever ratios simultaneously and in the same direction but at different rates.

References Cited in the file of this patent

UNITED STATES PATENTS

| | | |
|---|---|---|
| 2,039,495 | Schlosser | May 5, 1936 |
| 2,087,885 | Fleischel | July 27, 1937 |
| 2,189,335 | Ace et al. | Feb. 6, 1940 |
| 2,308,499 | Eksergian | Jan. 19, 1943 |
| 2,312,258 | Martin | Feb. 23, 1943 |
| 2,356,231 | Ferguson | Aug. 22, 1944 |